Mar. 3, 1925. 1,528,708
H. P. THIELE
CARPET BEATER
Filed Feb. 3, 1923
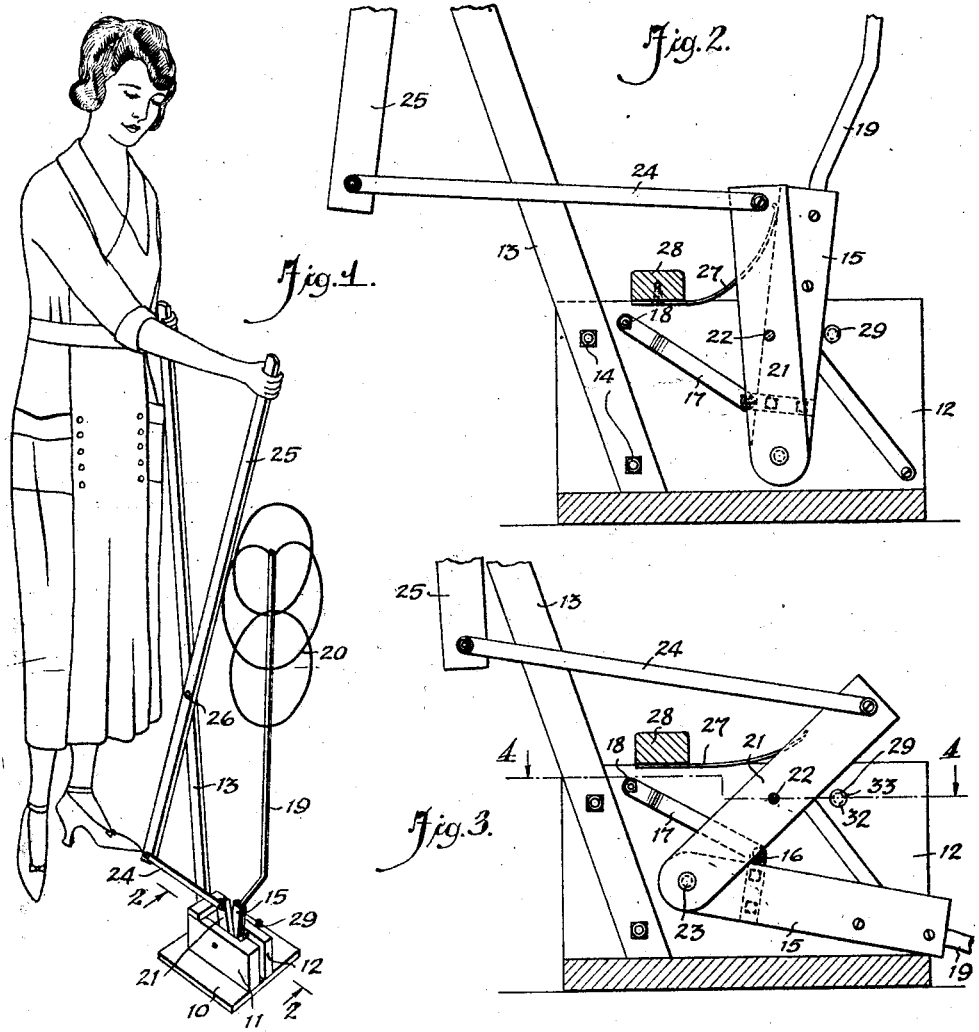
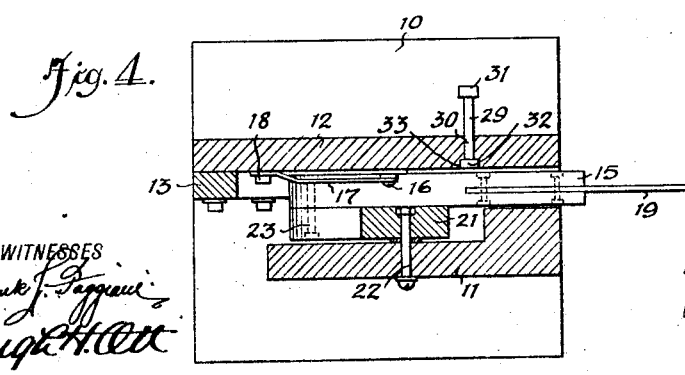
INVENTOR
HENRY P. THIELE Patented Mar. 3, 1925.

1,528,708

UNITED STATES PATENT OFFICE.

HENRY P. THIELE, OF NEWARK, NEW JERSEY.

CARPET BEATER.

Application filed February 3, 1923. Serial No. 616,750.

*To all whom it may concern:*

Be it known that I, HENRY P. THIELE, a citizen of the United States, and a resident of Newark, in the county of Essex and State of New Jersey, have invented a new and Improved Carpet Beater, of which the following is a full, clear, and exact description.

This invention has relation to carpet beaters and the same is in the nature of an improvement over my co-pending application filed October 12, 1922, and bearing Serial No. 594,163.

The principal object and advantage of the present invention is to increase by a system of levers the force of the blow of the beater element against the carpet, rug or other article upon which it operates, while at the same time decreasing the amount of force necessary to operate the same.

As a further object the invention aims to produce a device of the character described which is simple in its construction, inexpensive to manufacture, and which is highly efficient in its purpose.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a perspective view illustrating the beater in operation.

Figure 2 is a fragmentary longitudinal sectional view taken approximately on the line 2—2 of Figure 1 and illustrating the position of the parts when the beater element is in raised position.

Figure 3 is a similar view illustrating the position of the parts when the beater is in lowered position.

Figure 4 is a horizontal sectional view taken approximately on the line 4—4 of Figure 3.

Referring to the drawing by characters of reference, the device comprises a base 10 which preferably consists of an oblong block of wood provided with spaced parallel upstanding walls 11 and 12 to one of which an upwardly and rearwardly projecting handle 13 is attached by bolts or other fastening elements 14. An arm 15 is pivotally attached between its ends as at 16 to one extremity of a link 17, the opposite end of which is pivotally connected with the inner side of the wall 12. The shank 19 of a beater element 20 is secured to and extends outwardly from the arm 15 whereby the beater element is mounted from the base for vertical swinging movement, said arm being guided between the confronting faces of the walls 11 and 12. The mechanism for actuating the beater includes a lever 21 which is pivoted as at 22 to the wall 11 and connected as at 23 at one end to the inner end of the arm 15. The opposite extremity of the lever 21 is connected by a link bar 24 to the lower end of a manipulating lever or handle 25 which is pivoted as at 26 to the handle 13.

In use and operation, the operator grasps the upper end of the handle 13 in the left hand and the upper end of the manipulating lever or handle 25 in the right hand, the base 10 being placed on the rug, carpet or other article to be operated on. By moving the upper end of the lever alternately in a forward and rearward direction, a rocking motion will be imparted to the lever 21 through the medium of the link bar 24 which lever, will, in turn successively raise and lower the arm 15 and effect a beating action of the beating element 20 against the rug or carpet. The link 17, to the free end of which the arm 15 is fulcrumed or pivoted will compensate for the relative movement of the arm and lever 21. In order to buff and gradually arrest the movement of the arm 15 and the beater in its uppermost position, a leaf spring 27 is employed which is attached to a cross piece 28 bridging the walls 11 and 12, the free end of which spring is disposed in the path of movement of the arm 15. In order to provide means for locking or retaining the beater and the arm 15 in a substantially vertical position when not in use, a sliding pin 29 is mounted in a transverse opening 30 in the wall 12, said pin having heads 31 and 32 at its opposite ends which serve to prevent displacement or disconnection of the pin with the wall. When the beater is in use, the head 32 lies in an enlarged recess 33 in the inner face of the wall 12. When it is desired to lock the beater and arm 15 in a vertical position, the pin 29 is projected laterally across the path of movement of the arm.

By the foregoing construction and arrangement it will be understood that a minimum amount of energy is required to obtain a maximum beating force, while the operator will be removed a sufficient distance from the actual point of contact of the beater with the carpet or rug to avoid dust resulting from the beating operation.

I claim:

1. A carpet beater comprising a base, a pair of spaced longitudinal parallel upstanding walls on said base, a beater element, a movable pivot for swingingly supporting the beater from the base between the upstanding walls, a rock lever pivoted between said walls and connected at one end to the inner extremity of the beater element, a rearwardly and upwardly projecting handle connected to the base, a manipulating lever pivoted to said handle, and a connection between the free end of the rock lever and the lower end of the manipulating lever whereby upon operation of the manipulating lever the beater element will be swung on its pivot and brought forcibly into contact with the carpet.

2. A carpet beater comprising a base, a pair of spaced longitudinal parallel upstanding walls on said base, a beater element, a movable pivot for swingingly supporting the beater from the base between the upstanding walls, a rock lever pivoted between said walls and connected at one end to the inner extremity of the beater element, a rearwardly and upwardly projecting handle connected to the base, a manipulating lever pivoted to said handle, a connection between the free end of the rock lever and the lower end of the manipulating lever whereby upon operation of the manipulating lever the beater element will be swung on its pivot and brought forcibly into contact with the carpet, and means disposed in and adjacent the end of the path of movement of the beater toward its upraised position for yieldably limiting its movement in said direction.

HENRY P. THIELE.